United States Patent [19]
Alon et al.

[11] Patent Number: 5,825,743
[45] Date of Patent: Oct. 20, 1998

[54] ILLUMINATING MULTIPLE DATA TRACKS OF AN OPTICAL DISK WITH A LASER SOURCE OF REDUCED COHERENCE

[75] Inventors: Amir Alon, Sunnyvale, Calif.; Shlomo Shapira, Petach-Tikva, Israel

[73] Assignee: ZEN Research N.V., Curacao, Netherlands Antilles

[21] Appl. No.: 676,554

[22] Filed: Jul. 8, 1996

Related U.S. Application Data

[60] Continuation-in-part of Ser. No. 393,802, Feb. 24, 1995, Pat. No. 5,535,189, which is a division of Ser. No. 43,254, Apr. 6, 1993, Pat. No. 5,426,623.

[51] Int. Cl.$^6$ ..................................................... G11B 7/00
[52] U.S. Cl. ...................... 369/121; 369/44.37; 369/102; 369/107; 369/116
[58] Field of Search ............................ 369/32, 103, 102, 369/112, 44.23, 44.37, 121, 44.14, 116, 109, 107, 122; 359/896, 641

[56] References Cited

U.S. PATENT DOCUMENTS

| | | | |
|---|---|---|---|
| 4,116,542 | 9/1978 | Moncur et al. | 359/896 |
| 4,486,870 | 12/1984 | Pettigrew et al. | 369/44.14 |
| 5,426,623 | 6/1995 | Alon et al. | 369/112 |
| 5,535,189 | 7/1996 | Alon et al. | 369/102 |
| 5,608,716 | 3/1997 | Koyama et al. | 369/122 |

*Primary Examiner*—Georgia Y. Epps
*Assistant Examiner*—Kim-Kwok Chu
*Attorney, Agent, or Firm*—Fish & Neave; Nicola A. Pisano

[57] ABSTRACT

Methods and apparatus are provided for illuminating an optical disk in a multi-track optical disk reader. A laser beam is collimated and focused onto an area including multiple, adjacent data tracks on the optical disk. To minimize noise caused by interference resulting from the reflection of multiple beams from the optical disk the coherency of the laser beam is reduced. This is accomplished by one or more of the following techniques: passing the laser beam through a multi-mode optical fiber, combining laser beams from multiple independent laser sources, and modulating the laser operating current at high frequency.

23 Claims, 3 Drawing Sheets

ILLUMINATING MULTIPLE DATA TRACKS OF AN OPTICAL DISK WITH A LASER SOURCE OF REDUCED COHERENCE

RELATED APPLICATION DATA

This application is a continuation-in-part of U.S. patent application Ser. No. 08/393,802, filed Feb. 24, 1995, now U.S. Pat. No. 5,535,189, issued Jul. 9, 1996, entitled "OPTICAL INFORMATION SYSTEM WITH A BROAD NON-COHERENT IRRADIATING BEAM COUPLED WITH OPTICAL FIBER FROM A LASER SOURCE," which is a divisional application of U.S. patent application Ser. No. 08/043,254, filed Apr. 6, 1993, now U.S. Pat. No. 5,426,623, issued Jun. 20, 1995, entitled "METHOD FOR ACQUIRING THE TRACK DATA FROM A MULTIPLE TRACK IMAGE AND OPTICAL DISK".

FIELD OF THE INVENTION

This invention relates to methods and apparatus for reading multiple data tracks on an optical disk, and more particularly to methods and apparatus for providing wide area illumination in a multi-track optical disk reader.

BACKGROUND OF THE INVENTION

Optical disks have become widely used in part due to their relatively high storage capacity. Whereas a 3½ inch floppy disk can store 1.44 Mb (megabytes) of data, a 12 centimeter compact (optical) disk can store upwards of 650 Mb. Optical disks have therefore become increasingly popular for data storage for personal computer systems, and may be either read-only CD-ROMs, recordable CD's, or multimedia disks, which combine music with multimedia content. Future developments promise to bring increased data storage capacity and faster access times to optical disk technology, increasing its value as a data storage media, such as the proposed Digital Video Disk format (DVD).

A CD generally includes a transparent plastic substrate having data encoded in pits that are impressed into the surface of the substrate along spiral or concentric data tracks. A metalization layer deposited on the pitted substrate provides a reflective surface, and a protective transparent layer is then deposited on the metalization layer. To read the data, light is reflected off of the metalization layer and sensed by a detector in an optical pickup assembly of the optical disk reader.

As the disk is rotated, pits along a data track sequentially pass under an illumination source. The presence of a pit in the data track causes destructive interference to occur between light reflecting from the pit and light reflecting from the area surrounding the pit. The intensity of the reflected light is thus modulated by the pattern of data pits in the disk substrate.

The modulated, reflected light is directed to a detector that develops electronic signals corresponding to the intensity of the reflected light. These electronic signals are then demodulated by processing circuitry to recover the digital information stored on the optical disk. Further details regarding the construction and use of optical disks can be found in *Compact Disc Technology*, Nakajima, H. and Ogawa, H., translated by Aschmann, C., published by Ohmsha, Ltd., Japan (1992), and *The Compact Disc Handbook*, Pohlmann, K., 2nd ed., A–R Editions, 1992.

The increased availability of CD-ROM products, coupled with the availability of increasingly faster microprocessors, has created a need for ever faster optical disk drives. As a result, disk drives capable of operating at speeds higher than that of a standard speed drive are becoming available. For example, drives having a spindle speed up to ten times (10×) the spindle speed of a standard drive are now available.

Previously known techniques for designing such high speed optical disk drives relied on increasing the rotational speed of the optical disk to reduce latency and increase data transfer rates. For example, in an 8X disk drive, the disk is rotated at speeds up to 4800 rpm when reading the innermost data track, compared to approximately 600 rpm in a standard speed drive. However, the ability to achieve even greater speeds may soon be limited by the ability of such technology to continue to provide low-cost, easily manufacturable systems, since the use of greater disk rotational speeds requires more sophisticated designs using tighter tolerances than employed in previously known arrangements.

An alternative to simply increasing the disk rotational speed is to read multiple data tracks simultaneously, as described in commonly assigned U.S. Pat. No. 5,426,623, the entirety of which is incorporated herein by this reference. In accordance with the methods and apparatus provided therein, for example, ten adjacent data tracks may be read simultaneously, resulting in a tenfold increase in the rate of reading data from an optical disk. Thus, even if the disk is rotated at only twice standard speed (i.e., a 2X drive is used), the capability to read ten tracks provides the equivalent of a 20X drive.

However, implementing an optical disk reader with the capability to read multiple data tracks simultaneously presents new design challenges. In previously known optical disk readers, a laser beam is focused onto a single track of the reflective, data bearing layer of an optical disk. The light reflected from that layer is then imaged onto a detector element using suitable optics. When it is desired to read multiple adjacent tracks of an optical disk, however, light beams reflected from the multiple adjacent tracks may destructive interfere with one another due to the coherent nature of the incident laser beam. Consequently, a single coherent laser source cannot be used alone to image multiple adjacent data tracks. By contrast, previously known non-coherent light sources, such as incandescent light sources, cannot provide the illumination intensity required to provide suitable imaging from the reflective surface of an optical disk.

In view of the foregoing, it would be desirable to provide methods and apparatus for illuminating an optical recording medium to enable reading of multiple tracks of the recording medium with a laser source, so that the reflected beams are of sufficient intensity to provide adequate signal strength to the optical detector.

It would further be desirable to provide apparatus and methods for reducing the temporal and spatial coherence of a laser source to provide an illumination source suitable for reading multiple adjacent tracks of an optical disk.

SUMMARY OF THE INVENTION

It is a therefore an object of the present invention to provide methods and apparatus for illuminating an optical recording medium to enable reading of multiple tracks of the recording medium with a laser source, so that the reflected beams are of sufficient intensity to provide adequate signal strength to the optical detector.

It is a further an object of the present invention to provide effective illumination of multiple data tracks of an optical disk in a multiple track optical disk reader that reduces the effects of interference due to the high coherency of previously known laser sources.

In accordance with these and other objects of the present invention, methods and apparatus are disclosed for reducing temporal (phase) and spatial coherency of a laser beam used to illuminate the surface of an optical disk. Specifically, optical fibers, arrays of lasers, and high frequency modulation techniques may be employed to reduce temporal coherence of the illumination thereby reducing the strength and stability of any diffraction induced interference.

BRIEF DESCRIPTION OF THE DRAWINGS

The above and other objects of the invention, its nature and various advantages, will be apparent upon consideration of the following detailed description, taken in conjunction with the accompanying drawings, in which like reference characters refer to like parts throughout, and in which.

DETAILED DESCRIPTION OF THE INVENTION

Figure 1:
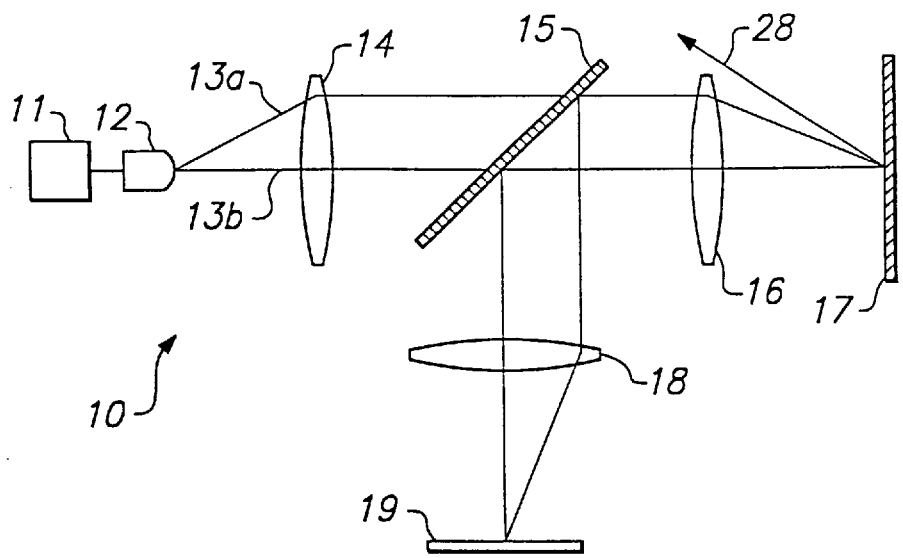
FIG. 1 is a schematic representation of an optical system of a prior art optical disk reader.

Referring first to FIG. 1, a schematic representation of the optical components of a previously known optical disk reader are described. Laser diode 12 is connected to current source 11 that excites laser diode 12 to emit a beam of light (represented by rays 13a and 13b), which is collimated by lens 14 before passing through beam splitter 15. The laser beam is then focused into a small spot on the surface of optical disk 17 by lens 16. Incident light reflected by optical disk 17 is redirected to optical sensor 19 by beam splitter 15 and lens 18, where it is converted to an electrical signal for further processing by the optical disk reader.

Figure 2:
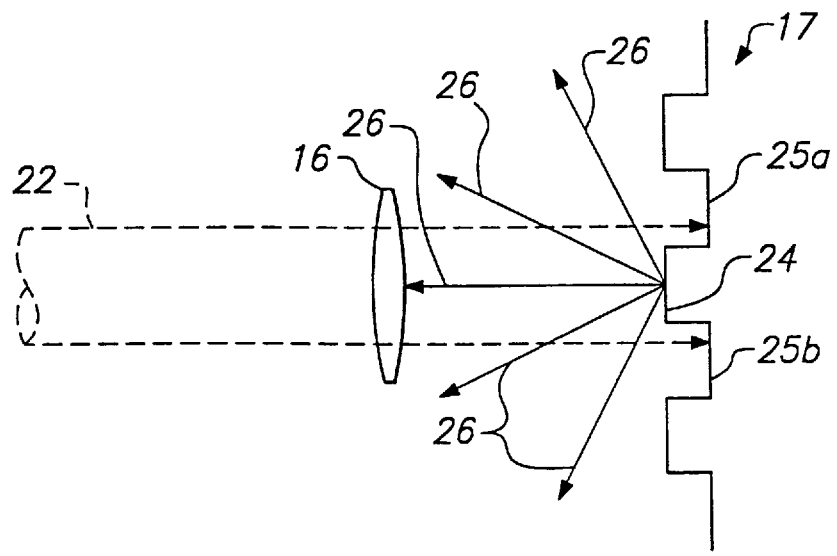
FIG. 2 illustrates the effect of reflecting a sharply focused laser beam from the data-bearing surface of an optical disk using the prior art optical system of FIG. 1.

As depicted in FIG. 2, incident light is reflected from the reflective surface of optical disk 17 to produce multiple reflected beams 26. For example, illuminating laser beam 22 is focused so that it falls on pits in data track 24 as well as on inter-track lands 25a and 25b adjacent to data track 24. Reflected beams 26 within the angle subtended by lens 16 are directed by the optical system to the optical sensor 19, where they are sensed to generate suitable electronic signals, as is well known in the art.

Figure 3:
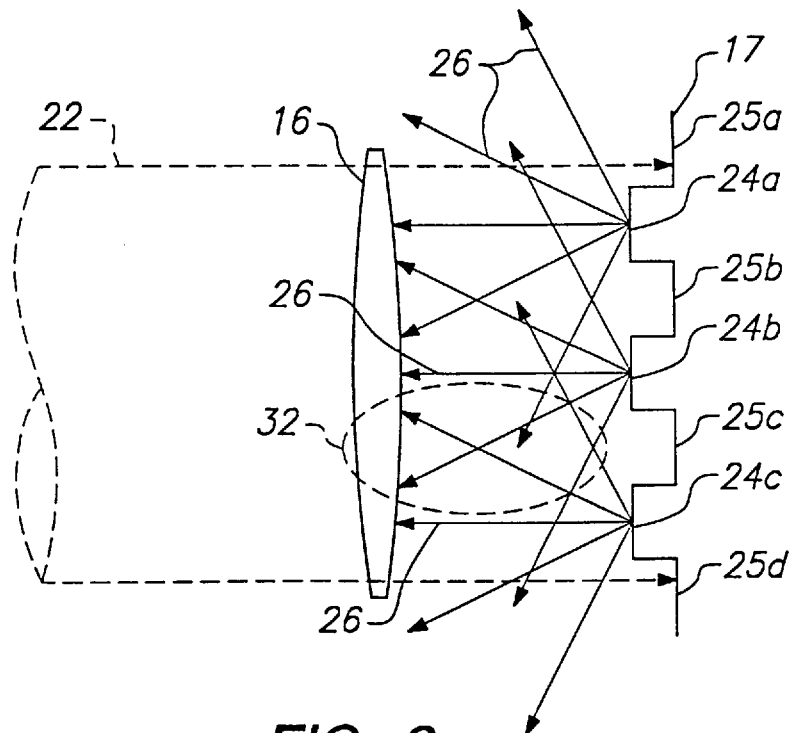
FIG. 3 illustrates the effect of illuminating multiple data tracks with a single laser beam.

If scaled for use in reading multiple adjacent tracks of optical disk 17, laser beam 22 could be arranged to cover numerous data tracks on the optical disk, as shown in FIG. 3. In this instance, however, multiple reflected beams 26 generated by the data in adjacent data tracks 24a–c and inter-track lands 25a–d would destructively interfere, as depicted by reflected beams 32. This interference, which results from the highly coherent nature of previously known laser illumination sources and may render the resulting signal imaged onto the optical sensor excessively noisy or even useless.

In addition, because an optical disk reader is a mechanical system, there is invariably some vibration introduced into the system. For example, a tracking servo-mechanism may cause some vibration in the optical system components. Similarly, a small dust particle or warp in the surface of optical disk 17, and the attendant movement of lens 16 to maintain focus, may also cause changes in light ray path lengths. Referring back to FIG. 1, the path lengths of light rays 13a and 13b may, therefore, vary, causing relative phase shifts to light rays 13a and 13b causing the interference pattern to shift about relative to optical sensor 19. Because the shifting patterns fall on optical sensor 19, they hinder detection of track data signals, appearing as excess noise in the output of optical sensor 19.

Figure 4A:
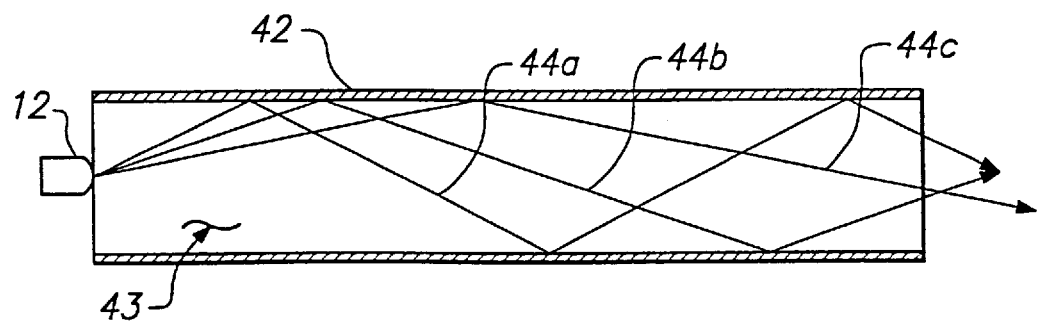
FIGS. 4A and 4B depict the effects of passing light rays through stepped-index and graded-index multi-mode optical fibers, respectively, in accordance with the present invention.
Figure 4B:
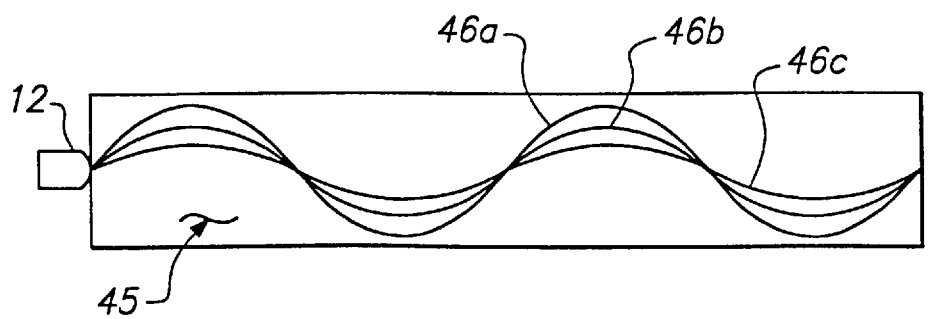

Thus, in accordance with the principles of the present invention, various methods and apparatus are employed to reduce the phase coherency of previously known laser illumination sources, thus making use of such lasers practicable in multi-track optical disk readers. In a first embodiment of the present invention the laser beam is passed through a multi-mode optical fiber, as shown in FIGS. 4A and 4B. Optical fiber 43 is a stepped-index optical fiber in which there is a discontinuity in the refractive index of the optical fiber between cladding 42 and core 43. The sudden change in refractive index causes light beams to be internally reflected at the boundary between the two. Optical fiber 45, in contrast, has a refractive index that varies radially, causing light rays to be gradually refracted back toward the center of optical fiber 45.

In multi-mode optical fibers 43 and 45 different light beams may travel different paths through the optical fiber. Thus, for example, stepped-index optical fiber 43 provides multiple paths for light rays 44a–c to travel through the fiber, and optical fiber 45 provides multiple paths for light rays 48a–c. The light rays are in phase when they are emitted by laser diode 12; however, because the light rays travel different paths the rays are no longer in phase when they exit optical fiber 43 and 45. Thus, the exiting light will exhibit numerous phase shifts over time, or phase jitter. This effectively reduces the stability of any interference patterns created by the wide area illumination.

Figure 5:
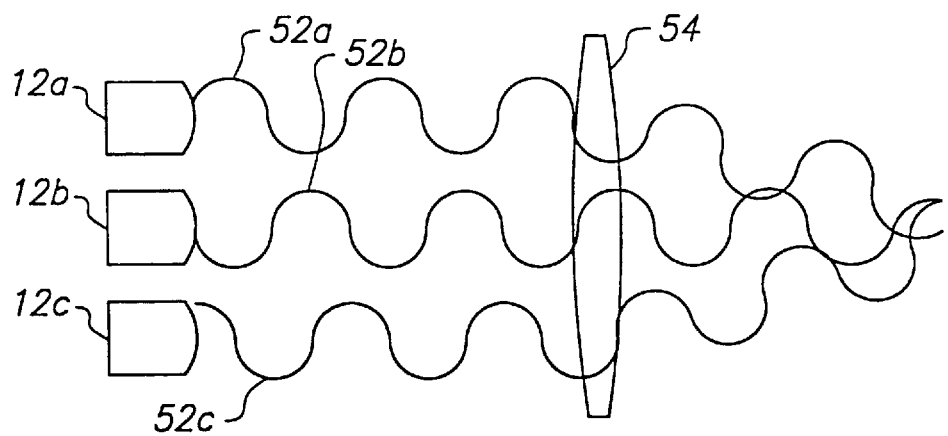
FIG. 5 illustrates the effect of providing wide area illumination using multiple laser sources in accordance with an alternative embodiment of the present invention.

In accordance with a second embodiment of the present invention, phase coherency may also be reduced by combining the output of multiple laser diodes to provide illumination of an optical disk. The phase coherency of a laser beam is related to the fact that all of the light rays within the beam were emitted by the same device. Light emitted from separate laser devices may not be in phase with each other. This is illustrated in FIG. 5, wherein three laser diodes 12a–c are provided emitting light waves 52a–c, respectively. Since laser diodes 12a–c are independent of one another, their outputs are independent of one another and may not be in phase. Thus, laser beams 52a–c may be combined to create a non-coherent, high intensity, source of illumination. As discussed above, reducing phase coherency in wide area illumination weakens interference patterns and thereby reduces interference-based noise.

Figure 6:
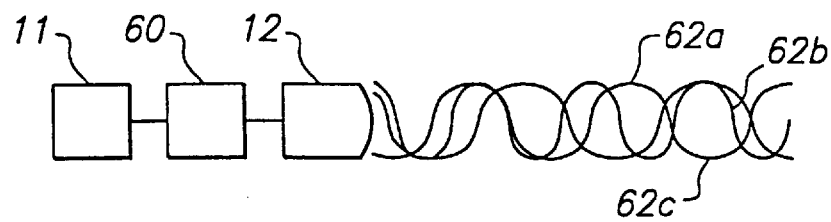
FIG. 6 shows the effect of modulating a laser source at a high frequency in accordance with a further embodiment of the present invention.

Referring now to FIG. 6, yet another embodiment of the present invention is described in which single laser 12 may be used by operating the laser in multiple modes. A typical laser diode begins to emit light when a certain threshold current is exceeded. As the current through the laser diode increases above the threshold, the device passes through various operating modes. In some modes, the laser diode may emit light at numerous, closely spaced frequencies, whereas in other modes the diode may emit light predominately at a single frequency. Furthermore, light emitted in one mode is likely to be out of phase with light emitted in another mode.

Thus, in accordance with the principles of the present invention, current provided by current source 11 to laser diode 12 is modulated by circuitry 60 so that the laser diode is continually switched on and off. Circuitry 60 may comprise any suitable switching circuitry suitable capable of operating at high frequency. The laser diode current is preferably modulated at a high frequency, for example, greater than 100 MHZ, such as at 500 MHZ, so that the laser diode is prevented from operating in any single mode for a significant period of time. As a result of the high frequency modulation, the light emitted by laser diode 12 has reduced temporal coherency.

Figure 7:
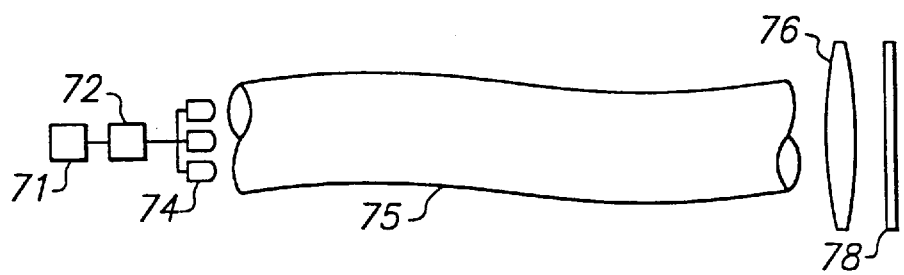
FIG. 7 is an illustrative embodiment of a wide area illumination source in accordance with the principles of the present invention.

With respect to FIG. 7, in still another embodiment of the present invention, the aforementioned embodiments are combined in various configurations. For example, in FIG. 7, each of the previous embodiments are used. Thus, high frequency modulator 72 may modulate drive current from current source 71 to the laser diodes of diode array 74. Furthermore, laser beams emitted by laser diode array 74 passed through optical fiber 75 to further reduce phase coherency. Finally, light exiting optical fiber 75 is collimated and focused onto an optical disk.

In addition, holographic beam shaping element 78 is provided to improve the energy profile of the illuminating beam. A typical laser beam has a Gaussian energy profile— i.e. more energy near the center of the beam than near its periphery. Such an uneven energy distribution may result in data tracks near the center of the illuminated area being more strongly illuminated than data tracks away from the center of the beam. Thus, less energy may be present in beams reflected from the distant tracks, effectively reducing the signal strength of those beams. To compensate, holographic beam shaping element 78 may be added to the optical system to provide a more uniform, or "top hat", energy distribution across the laser beam.

One skilled in the art will thus appreciate that the present invention may be practiced by other than the disclosed embodiments, which are presented for purposes of illustration and not of limitation, and the present invention is limited only by the claims which follow.

What is claimed is:

1. Apparatus for illuminating multiple adjacent data tracks of an optical disk, the apparatus comprising:
   a first laser diode generating a first laser beam;
   circuitry for providing a first operating current to the first laser diode; and
   a multi-mode optical fiber optically coupled to the first laser diode so that the first laser beam passes through the multi-mode optical fiber to reduce phase coherence in the first laser beam.

2. The apparatus as defined in claim 1 further comprising means for modulating the first operating current so that phase coherency of the first laser beam is reduced.

3. The apparatus as defined in claim 2 wherein the circuitry for modulating the first operating current, modulates the first operating current at frequencies greater than about 100 MHZ.

4. The apparatus as defined in claim 1 further comprising:
   at least a second laser diode generating a second laser beam and circuitry for providing a second operating current to the at least second laser diode, the at least second laser diode optically coupled to the multi-mode optical fiber so that the second laser beam passes through the multi-mode optical fiber.

5. The apparatus as defined in claim 4 further comprising circuitry for modulating the first and second operating currents at frequencies greater than about 100 MHZ.

6. Apparatus for illuminating multiple adjacent data tracks of an optical disk, the apparatus comprising:
   a first laser diode generating a first laser beam;
   circuitry for providing a first operating current to the first laser diode; and
   circuitry for modulating the first operating current so that operation of the laser diode passes through a plurality of operating modes.

7. The apparatus as defined in claim 6 wherein the circuitry for modulating the first operating current modulates the first operating current at frequencies in a range greater than 100 MHZ.

8. The apparatus as defined in claim 6 further comprising:
   at least a second laser diode and circuitry for providing an operating current to the at least second laser diode, wherein the second operating current is modulated so that operation of the second laser diode passes through a plurality of operating modes.

9. The apparatus as defined in claim 8 wherein the first operating current and the second operating current are modulated at frequencies in a range greater than 100 MHZ.

10. Apparatus for illuminating multiple adjacent data tracks of an optical disk, the apparatus comprising:
    a first laser diode generating a first laser beam;
    circuitry for providing a first operating current to the first laser diode;
    at least a second laser diode generating a second laser beam; and
    an optical component for combining the first and second laser beams.

11. The apparatus as defined in claim 10 wherein the optical component for combining the first and second laser beams comprises a multi-mode optical fiber.

12. The apparatus as defined in claim 10 further comprising a multi-mode optical fiber.

13. A method for illuminating multiple data tracks of an optical disk, the method comprising:
    providing a first laser to produce a first laser beam;
    passing the first laser beam through a multi-mode optical fiber; and
    directing the output of the multi-mode optical fiber at a surface of the optical disk.

14. The method as defined in claim 13 further comprising modulating an operating current of the first laser at frequencies greater than about 100 MHZ.

15. The method as defined in claim 13 further comprising:
    providing at least a second laser for producing a second laser beam; and
    passing the second laser beam through the multi-mode optical fiber.

16. The method as defined in claim 15 further comprising modulating an operating current of the first and the at least second lasers at frequencies above about 100 MHZ.

17. A method for illuminating multiple data tracks of an optical disk, the method comprising:
    providing a first laser to produce a first laser beam;
    directing the first laser beam at a surface of the optical disk; and modulating an operating current of the first laser so that temporal coherency of the first laser beam is reduced.

18. The method as defined in claim 17 further comprising passing the first laser beam through a multi-mode optical fiber.

19. The method as defined in claim 17 further comprising:

providing at least a second laser to produce a second laser beam;

combining the first and second laser beams; and modulating an operating current for the at least second laser so that temporal coherency of the second laser beam is reduced.

20. The method as defined in claim 19 further comprising passing the first and second laser beams through a multi-mode optical fiber.

21. Apparatus for illuminating multiple adjacent data tracks of an optical disks the apparatus comprising:

a first laser diode generating a first laser beam having a first phase coherence;

circuitry for providing a first operating current to the first laser diode; and an optical component comprising a light transmissive cylinder and a diffractive element optically coupled in series to the first laser diode, wherein the first laser beam exits the optical component with a second phase coherence lower than the first phase coherence.

22. The apparatus as defined in claim 21 wherein the first laser beam exiting the optical fiber has a first energy distribution and the diffractive element redistributes the energy distribution of the first laser beam to a second energy distribution which is more uniform than the first energy distribution.

23. A method for illuminating multiple data tracks of an optical disk, the method comprising:

providing a first laser to produce a first laser beam;

providing an optical component comprising a light transmissive cylinder and a diffractive element;

optically coupling the optical component to the first laser to reduce phase coherence of the first laser beam; and directing the first laser beam at a surface of the optical disk.

* * * * *